United States Patent
Sohn et al.

(10) Patent No.: US 11,955,601 B2
(45) Date of Patent: Apr. 9, 2024

(54) SULFIDE SOLID ELECTROLYTE FOR ALL-SOLID SECONDARY BATTERY, METHOD OF PREPARING SAME, AND ALL-SOLID SECONDARY BATTERY INCLUDING THE SAME

(71) Applicants: SAMSUNG SDI CO., LTD., Yongin-si (KR); INDUSTRY-ACADEMIA COOPERATION GROUP OF SEJONG UNIVERSITY, Seoul (KR)

(72) Inventors: Dongrak Sohn, Yongin-si (KR); Minsang Song, Yongin-si (KR); Jungmin Han, Yongin-si (KR); Younggyoon Ryu, Yongin-si (KR); Kyulin Lee, Yongin-si (KR); Jeongdoo Yi, Yongin-si (KR); Sangil Han, Yongin-si (KR); Keesun Sohn, Yongin-si (KR); Sunggeun Shim, Yongin-si (KR); Jinhee Lee, Yongin-si (KR)

(73) Assignees: SAMSUNG SDI CO., LTD., Yongin-si (KR); INDUSTRY-ACADEMIA COOPERATION GROUP OF SEJONG UNIVERSITY, Yongin-si (KR)

( * ) Notice: Subject to any disclaimer, the term of this patent is extended or adjusted under 35 U.S.C. 154(b) by 142 days.

(21) Appl. No.: 17/412,589

(22) Filed: Aug. 26, 2021

(65) Prior Publication Data
US 2022/0069343 A1 Mar. 3, 2022

(30) Foreign Application Priority Data
Aug. 31, 2020 (KR) .................. 10-2020-0110596

(51) Int. Cl.
*H01M 10/0562* (2010.01)
*C01B 17/22* (2006.01)
(Continued)

(52) U.S. Cl.
CPC ......... *H01M 10/0562* (2013.01); *C01B 17/22* (2013.01); *H01M 4/366* (2013.01);
(Continued)

(58) Field of Classification Search
CPC .. H01M 10/0562; H01M 4/366; H01M 4/382; H01M 10/0525; H01M 10/0585;
(Continued)

(56) References Cited

U.S. PATENT DOCUMENTS 8,075,865 B2 12/2011 Deiseroth et al.
8,329,340 B2 12/2012 Mori et al.
(Continued)

FOREIGN PATENT DOCUMENTS

CN 108238616 A 7/2018
EP 3734616 A1 11/2020
(Continued)

OTHER PUBLICATIONS

Liu, F., Wang, L., Zhang, Z., Shi, P., Feng, Y., Yao, Y., Ye, S., Wang, H., Wu, X. and Yu, Y., (2020) Advanced Functional Materials, 30(23), 2001607 (Year: 2020).*
(Continued)

*Primary Examiner* — Milton I Cano
*Assistant Examiner* — Albert Michael Hilton
(74) *Attorney, Agent, or Firm* — Lee IP Law, P.C.

(57) ABSTRACT

A sulfide solid electrolyte for all-solid secondary batteries, a method of preparing the same, and an all-solid secondary battery, the sulfide solid electrolyte including lithium, phosphorus, sulfur, and a halogen, wherein: the sulfide solid electrolyte has an argyrodite-type crystal structure, a ratio
(Continued)

($I_{(29.0)}/I_{(30.0)}$ ratio) of a peak intensity at a 2θ of 29±0.1° to a peak intensity at a 2θ of 30±0.1° is 0.06 or less, the peak intensities being obtained by X-ray diffraction analysis of the sulfide solid electrolyte, and a ratio ($I_{(27.1)}/I_{(30.0)}$ ratio) of a peak intensity at a 2θ of 27.1±0.1° to a peak intensity at a 2θ of 30±0.1° is 0.06 or less, the peak intensities being obtained by X-ray diffraction analysis of the sulfide solid electrolyte.

14 Claims, 7 Drawing Sheets

(51) Int. Cl.
| | |
|---|---|
| *H01M 4/36* | (2006.01) |
| *H01M 4/38* | (2006.01) |
| *H01M 4/587* | (2010.01) |
| *H01M 10/0525* | (2010.01) |
| *H01M 10/0585* | (2010.01) |
| *H01M 4/02* | (2006.01) |

(52) U.S. Cl.
CPC .......... *H01M 4/382* (2013.01); *H01M 4/587* (2013.01); *H01M 10/0525* (2013.01); *H01M 10/0585* (2013.01); *C01P 2002/72* (2013.01); *H01M 2004/027* (2013.01); *H01M 2300/008* (2013.01)

(58) Field of Classification Search
CPC ...... H01M 2004/027; H01M 2300/008; C01B 17/22
See application file for complete search history.

(56) References Cited

U.S. PATENT DOCUMENTS

| | | |
|---|---|---|
| 9,401,525 B2 | 7/2016 | Zumi |
| 9,899,701 B2 | 2/2018 | Miyashita et al. |
| 9,899,702 B2 | 2/2018 | Miyashita et al. |
| 10,483,587 B2 | 11/2019 | Terai et al. |
| 11,196,083 B2 | 12/2021 | Takahashi et al. |
| 2017/0222257 A1 | 8/2017 | Miyashita et al. |
| 2018/0069262 A1 | 3/2018 | Utsuno et al. |
| 2019/0140314 A1 | 5/2019 | Utsuno et al. |
| 2019/0312304 A1 | 10/2019 | Uesugi et al. |
| 2019/0326627 A1 | 10/2019 | Seong et al. |
| 2020/0052327 A1 | 2/2020 | Osada |
| 2021/0075058 A1 | 3/2021 | Nakayama et al. |

FOREIGN PATENT DOCUMENTS

| | | | |
|---|---|---|---|
| JP | 2008-059999 A | 3/2008 | |
| JP | 2016-035921 A | 3/2016 | |
| JP | 2017-147205 A | 8/2017 | |
| JP | 6212592 B2 | 9/2017 | |
| JP | 2018-067552 A | 4/2018 | |
| JP | 6595152 B2 | 10/2019 | |
| JP | 2020-027701 A | 2/2020 | |
| KR | 10-1807583 B1 | 12/2017 | |
| KR | 10-2019-0007028 A | 1/2019 | |
| KR | 10-2020-0003929 A | 1/2020 | |
| WO | WO 2018/047565 A1 | 3/2018 | |
| WO | WO-2018047566 A1 * | 3/2018 | ............ C01B 25/14 |
| WO | WO 2019/131725 A1 | 7/2019 | |

OTHER PUBLICATIONS

Zhao, Y., Ye, Y., Wu, F., Li, Y., Li, L., & Chen, R. (2019). Anode interface engineering and architecture design for high-performance lithium-sulfur batteries. Advanced Materials, 31(12), 1806532 (Year: 2019).*
Machine translation of WO-2018047566-A1 (Year: 2023).*
European Search Report dated Jan. 25, 2022.
European Notice of Allowance dated May 31, 2023.
Japanese Office action dated Sep. 26, 2022.

* cited by examiner

SULFIDE SOLID ELECTROLYTE FOR ALL-SOLID SECONDARY BATTERY, METHOD OF PREPARING SAME, AND ALL-SOLID SECONDARY BATTERY INCLUDING THE SAME

CROSS-REFERENCE TO RELATED APPLICATION

This application is based on and claims priority under 35 U.S.C. § 119 to Korean Patent Application No. 10-2020-0110596, filed on Aug. 31, 2020, in the Korean Intellectual Property Office, the disclosure of which is incorporated by reference herein in its entirety.

BACKGROUND

1. Field

Embodiments relate to sulfide solid electrolytes for all-solid secondary batteries, methods of preparing the same, and all-solid secondary batteries including the same.

2. Description of the Related Art

To satisfy recent industrial demands, the development of batteries having high energy density and safety has been considered. For example, lithium-ion batteries have been commercialized in the fields of automobiles as well as information-related devices and communication devices. In the automobile fields, safety is particularly important as it relates to life.

SUMMARY

The embodiments may be realized by providing a sulfide solid electrolyte for all-solid secondary batteries, the sulfide solid electrolyte including lithium, phosphorus, sulfur, and a halogen, wherein the sulfide solid electrolyte has an argyrodite-type crystal structure, a ratio ($I_{(29.0)}/I_{(30.0)}$ ratio) of a peak intensity at a 2θ of 29±0.1° to a peak intensity at a 2θ of 30±0.1° is 0.06 or less, the peak intensities being obtained by X-ray diffraction analysis of the sulfide solid electrolyte, and a ratio ($I_{(27.1)}/I_{(30.0)}$ ratio) of a peak intensity at a 2θ of 27.1±0.1° to a peak intensity at a 2θ of 30±0.1° is 0.06 or less, the peak intensities being obtained by X-ray diffraction analysis of the sulfide solid electrolyte.

The $I_{(29.0)}/I_{(30.0)}$ ratio may be from 0.0006 to 0.04.

The $I_{(27.1)}/I_{(30.0)}$ ratio may be from 0.055 to 0.059.

An atomic ratio of lithium to sulfur (Li/S) in the sulfide solid electrolyte may be 1.13 or higher.

The sulfide solid electrolyte may be a compound represented by Formula 1 below, $$Li_aP_1S_bX_c \quad \text{Formula 1}$$

in Formula 1, X may be fluorine (F), chlorine (Cl), bromine (Br), or iodine (I), and 4.7<a<5.3, 4.4≤b≤4.5, and 0.7<c<1.5.

The sulfide solid electrolyte may be a compound represented by Formula 2 below, $$Li_aPS_bCl_c \quad \text{Formula 2}$$

in Formula 2, 5.04≤a≤5.28, 4.4≤b≤4.5, and 1.13≤c≤1.34.

The compound represented by Formula 1 may be $Li_{5.04}PS_{4.46}Cl_{1.13}$, $Li_{5.28}PS_{4.47}Cl_{1.34}$, $Li_{5.20}PS_{4.44}Cl_{1.32}$, $Li_{5.20}PS_{4.46}Cl_{1.29}$, or a combination thereof.

The sulfide solid electrolyte may have a Young's modulus of 80 GPa or higher.

The sulfide solid electrolyte may have an ionic conductivity of 2 mS/cm or higher.

The embodiments may be realized by providing an all-solid secondary battery including a positive electrode layer; a negative electrode layer; and a solid electrolyte layer therebetween, wherein the positive electrode layer or the solid electrolyte layer includes the sulfide solid electrode according to an embodiment.

The negative electrode layer may include a negative current collector, a first negative active material layer, and a second negative active material layer, the second negative active material layer may be on the first negative active material layer or between the negative current collector and the first negative active material layer, and the second negative active material layer may include lithium or a lithium alloy.

The negative electrode layer may include a negative current collector and a first negative active material layer, and a carbon layer may be between the first negative active material layer and the solid electrolyte layer.

The embodiments may be realized by providing a method of preparing the sulfide solid electrolyte for all-solid secondary batteries according to an embodiment, the method including mixing a sulfur precursor, a phosphorus precursor, and a halogen precursor, as precursors for forming a sulfide solid electrode, to prepare a precursor mixture, mechanically milling the precursor mixture of the sulfur precursor, the phosphorus precursor, and the halogen precursor; and heat-treating the precursor mixture at a temperature of 350° C. or higher.

The heat-treating may be performed under vacuum conditions at a temperature of 500° C. to 650° C. for 5 hour or longer.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
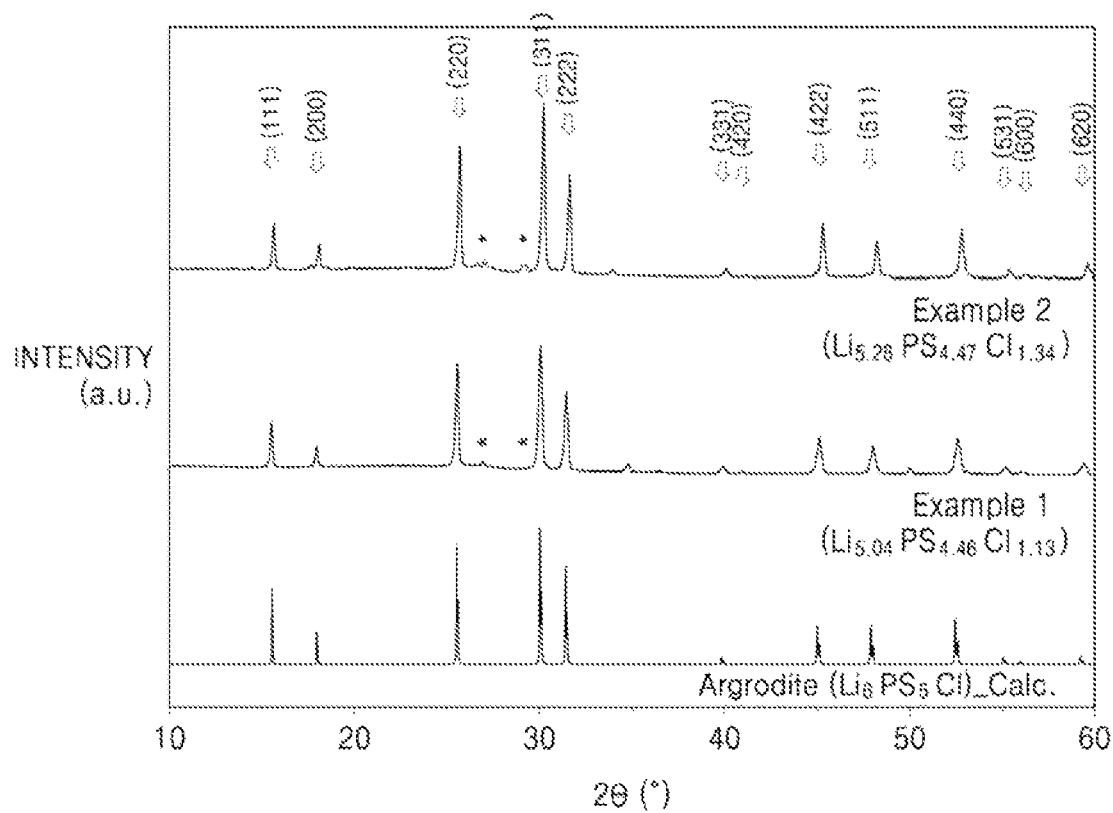
FIG. 1 shows X-ray diffraction (XRD) spectra of sulfide solid electrolytes prepared in Examples 1 and 2, and $Li_6PS_5Cl$.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" include any and all combinations of one or more of the associated listed items, e.g., "A or B" would include A, B, or A and B. Expressions such as "at least one of," when preceding a list of elements, modify the entire list of elements and do not modify the individual elements of the list.

Hereinafter, sulfide solid electrolytes for all-solid secondary batteries, all-solid secondary battery including the same, and methods of preparing the same according to embodiments will be described in detail.

As solid electrolytes of all-solid secondary batteries, argyrodite-type sulfide solid electrolytes may be used. However, some sulfide solid electrolytes could have insufficient ionic conductivity, physical properties, and electrochemical stability, and thus ionic conductivity, physical properties, and electrochemical stability may be improved.

One or more embodiments may provide an argyrodite-type sulfide solid electrolyte having a non-stoichiometric ratio, e.g., in which lithium and sulfur are relatively deficient.

Due to the non-stoichiometric ratio, e.g., in which lithium and sulfur are deficient, and defects in the lattice structure, the sulfide solid electrolyte according to an embodiment may exhibit higher ionic conductivity in a wide temperature range than an argyrodite-type sulfide solid electrolyte having a stoichiometric ratio. In an implementation, amounts of expensive lithium sulfide raw materials may be reduced, and manufacturing costs for the sulfide solid electrolyte may be reduced.

The sulfide solid electrolyte according to an embodiment may have an ionic conductivity of 2 mScm$^{-1}$ or more, e.g., 2.3 mScm$^{-1}$ to 5 mScm$^{-1}$ at 25° C.

The sulfide solid electrolyte according to an embodiment may include, e.g., lithium, phosphorus, sulfur, and a halogen, may have an argyrodite-type crystal structure, and a ratio ($I_{(29.0)}/I_{(30.0)}$ ratio) of a peak intensity at a 2θ of 29±0.1° to a peak intensity at a 2θ of 30±0.1° may be, e.g., 0.06 or less, the peak intensities obtained by X-ray diffraction analysis for the sulfide solid electrolyte. In an implementation, a ratio ($I_{(27.1)}/I_{(30.0)}$ ratio) of a peak intensity at a 2θ of 27.1±0.1° to a peak intensity at a 2θ of 30±0.1° may be, e.g., 0.06 or less, the peak intensities obtained by X-ray diffraction analysis for the sulfide solid electrolyte.

In an implementation, the halogen may include, e.g., fluorine (F), chlorine (Cl), bromine (Br), or iodine (I).

$I_{(27.1)}$ provides information related to Li$_2$S, $I_{(29.0)}$ provides information related to Li$_3$PS$_4$, and $I_{(30.0)}$ provides information related to Li$_a$P$_1$S$_b$X$_c$ that is an argyrodite phase.

Impurity phases may be observed at diffraction angles (2θ) of 17.5 to 18.5°, 26.5 to 27.5°, and 29°. As the impurity phases increase, ionic conductivity of the sulfide solid electrolyte may decrease. In an implementation, as peak intensities related to such impurity phases decrease, sulfide solid electrolyte having further improved ionic conductivity may be obtained.

The $I_{(29.0)}/I_{(30.0)}$ ratio of 0.06 or less and the $I_{(27.1)}/I_{(30.0)}$ ratio of 0.06 or less means low impurity phases indicating high purity. In this regard, the impurity phases are related to, e.g., low ion-conductive materials such as Li$_2$S and Li$_3$PS$_4$, and a material with a strong peak intensity related to the argyrodite Li$_a$P$_1$S$_b$X$_c$ associated with high ion-conductivity may have a higher ionic conductivity.

In the X-ray diffraction analysis on the sulfide solid electrolyte according to an embodiment, the $I_{(29.0)}/I_{(30.0)}$ ratio may be, e.g., from 0.0006 to 0.04, from 0.0007 to 0.038, or from 0.0008 to 0.035. In an implementation, the $I_{(27.1)}/I_{(30.0)}$ ratio may be, e.g., from 0.055 to 0.059 or from 0.0056 to 0.0058.

In an implementation, in the sulfide solid electrolyte according to an embodiment, an atomic ratio of lithium to sulfur (Li/S) may be 1.13 or more. e.g., 1.13 to 1.18. When the atomic ratio of lithium to sulfur (Li/S) is within the range above, all-solid batteries having high energy density may be prepared.

In an implementation, the sulfide solid electrolyte according to an embodiment may be a compound represented by Formula 1 below.

$$Li_aP_1S_bX_c \qquad \text{Formula 1}$$

In Formula 1, X may be a halogen element, e.g., fluorine (F), chlorine (Cl), bromine (Br), or iodine (I).

a, b, and c may satisfy the following relations: 4.7<a<5.3, 4.4≤b≤4.5, and 0.7<c<1.5.

In an implementation, a may be, e.g., from 4.8 to 5.29, from 4.9 to 5.28, or from 5.04 to 5.28. In an implementation, b may be, e.g., from 4.4 to 4.5 or from 4.44 to 4.47. In an implementation, c may be, e.g., from 0.8 to 1.45, from 1 to 1.4, from 1.1 to 1.35, or from 1.13 to 1.34.

The compound of Formula 1 may be, e.g., a compound represented by Formula 2 below.

$$Li_aPS_bCl_c \qquad \text{Formula 2}$$

In Formula 2, a may be, e.g., from 5.04 to 5.28, b may be, e.g., from 4.4 to 4.5, and c may be, e.g., from 1.13 to 1.34.

In an implementation, the compound represented by Formula 2 may be, e.g., Li$_{5.04}$PS$_{4.46}$Cl$_{1.13}$, Li$_{5.28}$PS$_{4.47}$Cl$_{1.34}$, Li$_{5.04}$PS$_{4.46}$Cl$_{1.13}$, Li$_{5.28}$PS$_{4.47}$Cl$_{1.34}$, Li$_{5.20}$ PS$_{4.44}$Cl$_{1.32}$, Li$_{5.20}$PS$_{4.46}$Cl$_{1.29}$, or any combination thereof.

In an implementation, a Young's modulus of the sulfide solid electrolyte according to an embodiment may be 80 GPa or more, e.g., from 80 GPa to 95 GPa. Due to high Young's modulus, the sulfide solid electrolyte may have excellent mechanical properties. The Young's modulus is a pressure consumed to obtain the same displacement, and a solid electrolyte layer having a higher density may be prepared using the same pressure.

The Young's modulus has the same meaning as a so-called "tensile modulus". The tensile modulus is measured using a dynamic mechanical analysis system (DMA800, TA Instruments), and a protective film sample is prepared according to ASTM standard D412 (Type V specimens). Then, the tensile modulus of the protective film is obtained by measuring strain with respect to stress at a rate of 5 mm/min at 25° C. with a relative humidity of about 30%. The tensile modulus is evaluated based on a slope of a stress-strain curve obtained as described above.

The Young's modulus of the sulfide solid electrolyte according to an embodiment may be measured by separating the solid electrolyte layer of the all-solid secondary battery, e.g., the Young's modulus of the separated solid electrolyte layer, may be measured using suitable methods and devices for measuring the above-described Young's modulus.

The all-solid secondary battery according to an embodiment may include, e.g., a positive electrode layer; a negative electrode layer; and a solid electrolyte layer between the positive electrode layer and the negative electrode layer. In an implementation, the positive electrode layer or the solid electrolyte layer may include, e.g., the sulfide solid electrolyte according to an embodiment.

All-Solid Secondary Battery

Figure 5:
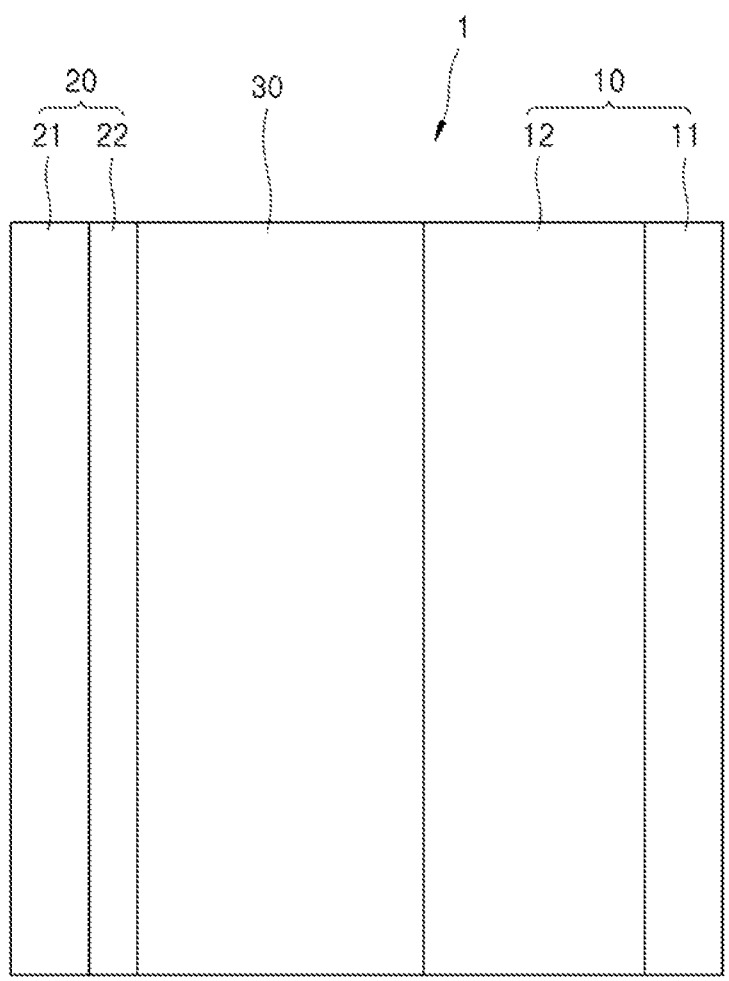
FIGS. 5 to 7 illustrate structures of an all-solid battery according to an embodiment.

Referring to FIG. 5, an all-solid secondary battery 1 may include, e.g., a positive electrode layer 10; a negative electrode layer 20; and a solid electrolyte layer 30 between the positive electrode layer 10 and the negative electrode layer 20.

In an implementation, the positive electrode layer 10 may include the solid electrolyte according to an embodiment.

In an implementation, the solid electrolyte layer 30 may include the solid electrolyte according to an embodiment.

The positive electrode layer 10 may include a positive current collector 11 and a positive active material layer 12 on the positive current collector 11. In an implementation, the positive active material layer 12 may include, e.g., a positive active material, a binder, and a solid electrolyte. The solid electrolyte may be the sulfide solid electrolyte according to an embodiment. In an implementation, the negative electrode layer 20 may include, e.g., a negative current collector 21 and a first negative active material layer 22 on the negative current collector 21.

Positive Electrode Layer: Positive Current Collector

The positive current collector 11 may be formed of, e.g., indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or any alloy thereof in the form of plate or foil. In an implementation, the positive current collector 1 may be omitted.

The positive current collector 11 may further include a carbon layer on one surface or both surfaces of a metal substrate. By additionally arranging the carbon layer on the metal substrate, corrosion of a metal of the metal substrate by the solid electrolyte included in the positive electrode layer 10 may be prevented and interfacial resistance between the positive active material layer 12 and the positive current collector 11 may be reduced. A thickness of the carbon layer may be, e.g., from 1 μm to 5 μm. As the thickness of the carbon layer considerably decreases, contact between the metal substrate and the solid electrolyte cannot be completely blocked. As the thickness of the carbon layer considerably increases, energy density of the all-solid secondary battery may decrease. The carbon layer may include amorphous carbon, crystalline carbon, or the like.

Positive Electrode Layer: Positive Active Material

The positive active material layer 12 may include, e.g., a positive active material, a solid electrolyte, a binder, and a solvent.

The positive active material layer 12 may include a conductive material. The conductive material may include, e.g., graphite, carbon black, acetylene black, carbon nanofiber, or a carbon nanotube.

The solid electrolyte included in the positive electrode layer 10 may be similar to or different from a solid electrolyte included in the solid electrolyte layer 30. For details of the solid electrolyte, refer to descriptions of the solid electrolyte layer 30.

The positive active material is a positive active material capable of reversibly absorbing and desorbing lithium ions. The positive active material may include, e.g., a lithium transition metal oxide such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, and lithium iron phosphate, nickel sulfite, copper sulfite, lithium sulfite, iron oxide, vanadium oxide, or another suitable positive active material. The positive active material may be used alone or in a combination of at least two thereof.

The lithium transition metal oxide may be a compound represented by, e.g., one of the following formulae: $Li_aA_{1-b}B'_bD_2$ (where $0.90 \leq a \leq 1$ and $0 \leq b \leq 0.5$); $Li_aE_{1-b}B'_bO_{2-c}D_c$ (where $0.90 \leq a \leq 1$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$. In the compounds above, A may be, e.g., Ni, Co, Mn, or any combination thereof; B' may be, e.g., Al, Ni, Co, Mn, Cr, Fe, Mg, Sr, V, a rear earth element, or any combination thereof; D' may be, e.g., O, F, S, P, or any combination thereof; E may be, e.g., Co, Mn, or any combination thereof; F' may be, e.g., F, S, P, or any combination thereof; G may be, e.g., Al, Cr, Mn, Fe, Mg, La, Ce, Sr, V, or any combination thereof; Q may be, e.g., Ti, Mo, Mn, or any combination thereof; I may be, e.g., Cr, V, Fe, Sc, Y, or any combination thereof; and J may be, e.g., V, Cr, Mn, Co, Ni, Cu, or any combination thereof. The above-described compound having a coating layer on the surface thereof may be used or a mixture of the above-described compound and a compound having a coating layer may also be used. The coating layer added to the surface of the compound may include, e.g., a compound of a coating element such as an oxide, hydroxide, oxyhydroxide, oxycarbonate, or hydroxycarbonate of the coating element. The compound constituting the coating layer may be amorphous or crystalline. The coating element included in the coating layer may be, e.g., Mg, Al, Co, K, Na, Ca, Si, Ti, V, Sn, Ge, Ga, B, As, Zr, or any mixture thereof. A method of forming the coating layer may be a suitable method not adversely affect physical properties of the positive active material. The coating methods may include, e.g., spray coating or dip coating.

The positive active material may include, e.g., a lithium salt of a transition metal oxide having a layered rock-salt type structure among the above-described lithium transition metal oxides. The "layered rock-salt type structure" is a structure in which a layer of oxygen atoms and a layer of metal atoms are alternately arranged regularly in the <111> direction of a cubic rock-salt type structure such that each atomic layer forms a two-dimensional plane. The "cubic rock-salt type structure" refers to a sodium chloride-type structure as one of the crystal structures. In an implementation, the cubic rock-salt type structure indicates a structure in which face centered cubic lattices (fcc) respectively formed of cations and anions are misarranged by only half a ridge of each unit lattice. The lithium transition metal oxide having such a layered rock-salt type structure may include, e.g., a ternary lithium transition metal oxide such as $LiNi_xCo_yAl_zO_2$ (NCA) or $LiNi_xCo_yMn_zO_2$ (NCM) (where $0<x<1$, $0<y<1$, $0<z<1$, and $x+y+z=1$). When the positive active material includes a ternary lithium transition metal oxide having a layered rock-salt type structure, energy density and thermal stability of the all-solid secondary battery 1 are further improved.

The positive active material may be covered with a coating layer as described above. The coating layer may be a suitable coating layer for positive active materials of all-solid secondary batteries. The coating layer may include, e.g., $Li_2O$—$ZrO_2$ (LZO).

When the positive active material includes, e.g., nickel in the form of a ternary lithium transition metal oxide such as NCA or NCM, capacity density of the all-solid secondary battery 1 may be increased to reduce elution of a metal of the positive active material during charging. Therefore, cycle characteristics of the all-solid secondary battery 1 may be improved during charging.

The positive active material may have a particle shape, e.g., a spherical shape or an elliptically spherical shape. In an implementation, a particle diameter of the positive active material may be within a suitable range applicable to positive active materials of conventional all-solid secondary batteries. In an implementation, the amount of the positive active material of the positive electrode layer 10 may be within a suitable range applicable to positive electrodes of conventional all-solid secondary batteries.

Positive Electrode Layer: Solid Electrolyte

The positive active material layer 12 may include, e.g., a solid electrolyte.

In an implementation, the positive active material 12 may include the sulfide solid electrolyte according to an embodiment.

The solid electrolyte included in the positive electrode layer 10 may be the same as or different from a solid electrolyte included in the solid electrolyte layer 30. For details of the solid electrolyte, refer to descriptions of the solid electrolyte layer 30.

The solid electrolyte included in the positive active material layer 12 may have an average particle diameter D50 smaller than that of the solid electrolyte included in the solid electrolyte layer 30. In an implementation, the average particle diameter D50 of the solid electrolyte included in the positive active material layer 12 may be, e.g., 90% or less, 80% or less, 70% or less, 60% or less, 50% or less, 40% or less, 30% or less, or 20% or less than an average particle diameter D50 of the solid electrolyte included in the solid electrolyte layer 30.

Positive Electrode Layer: Binder

The positive active material layer 12 may include a binder. The binder may include, e.g., polyvinylidene fluoride, styrene butadiene rubber (SBR), polytetrafluoroethylene, a vinylidenefluoride/hexafluoropropylene copolymer, polyacrylonitrile, or polymethylmethacrylate.

Positive Electrode Layer: Conductive Material

The positive active material layer 12 may include a conductive material. The conductive material may include, e.g., graphite, carbon black, acetylene black, Ketjen black, carbon nanofiber, metal powder, or the like.

Positive Electrode Layer: Other Additives

In an implementation, the positive electrode layer 10 may further include, e.g., a filler, a coating agent, a dispersing agent, or an ion-conductive agent, in addition to the positive active material, the solid electrolyte, the binder, and the conductive material as described above.

The filler, the coating agent, the dispersing agent, and the ion-conductive agent included in the positive electrode layer 10 may be formed of a suitable material used in electrodes of all-solid secondary batteries.

Solid Electrolyte Layer

The solid electrolyte included in the solid electrolyte layer may be the sulfide solid electrolyte according to an embodiment.

Solid Electrolyte Layer: Sulfide Solid Electrolyte

Figure 6:
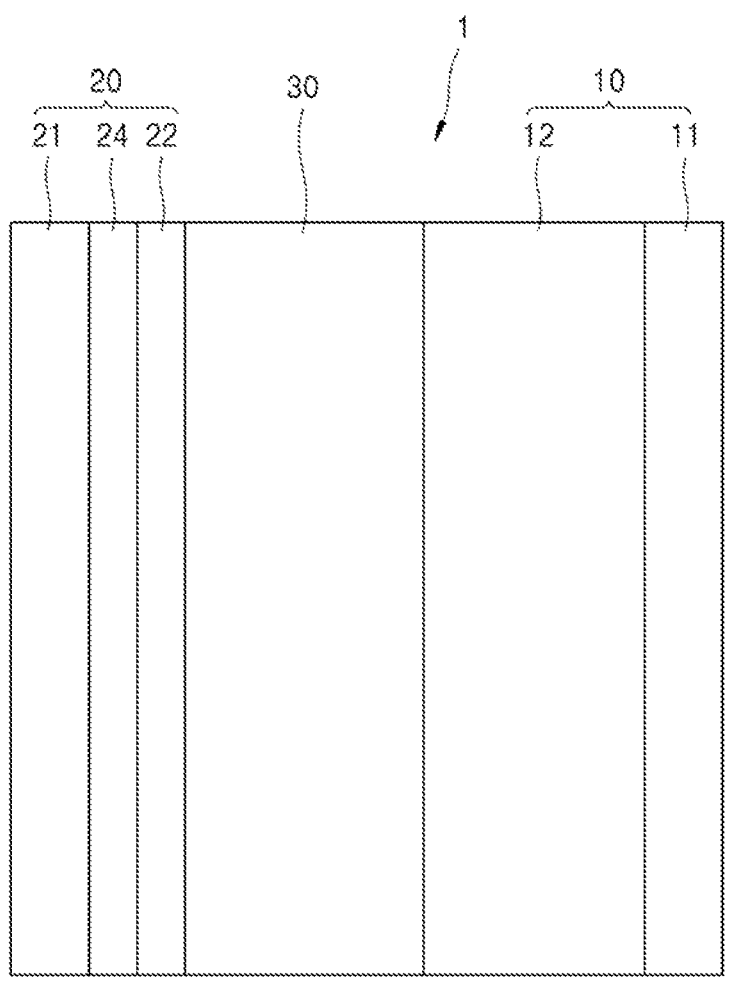

Referring to FIGS. 5 and 6, the solid electrolyte layer 30 may be between the positive electrode layer 10 and the negative electrode layer 20 and may include the sulfide solid electrolyte according to an embodiment, another suitable sulfide solid electrolyte, or any combination thereof.

In the all-solid secondary battery according to an embodiment, the solid electrolyte layer 30 including the sulfide solid electrolyte according to an embodiment may include another suitable sulfide solid electrolyte.

The other sulfide solid electrolyte may include, e.g., $Li_2S$—$P_2S_5$, $Li_2S$—$P_2S_5$—LiX (where X is a halogen element), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $L_2S$—$P_2S_5$—$Z_mS_n$ (where m and n are positive numbers and Z is Ge, Zn, or Ga), $Li_2S$—$GeS_2$, $Li_2S$—$SiS_2$—$Li_3PO_4$, $Li_2S$—$SiS_2$-$Li_pMO_q$ (where p and q are positive numbers and M is P, Si, Ge, B, Al, Ga, or In), $Li_{7-x}PS_{6-x}Cl_x$ (where 0≤x≤2), $Li_{7-x}PS_{6-x}Br_x$ (where 0≤x≤2), or $Li_{7-x}PS_{6-x}I_x$ (where 0≤x≤2). The sulfide solid electrolyte may be prepared by treating starting materials such as $Li_2S$ and $P_2S_5$ by melting quenching or mechanical milling. In an implementation, after such treatment, heat treatment may further be performed. The solid electrolyte may be in an amorphous state, a crystalline state, or a mixed state thereof. In an implementation, the solid electrolyte may include sulfur (S), phosphorus (P), or lithium (Li) as components of the above-described sulfide solid electrolyte materials. In an implementation, the solid electrolyte may be formed of a $Li_2S$—$P_2S_5$-containing material. When the $Li_2S$—$P_2S_5$-containing material is used as the sulfide solid electrolyte material constituting the solid electrolyte, a mixing molar ratio of $Li_2S$ to $P_2S_5$ ($Li_2S:P_2S_5$) may be, e.g., in the range of 50:50 to 90:10.

The sulfide solid electrolyte may be, e.g., an argyrodite-type compound including, e.g., $Li_{7-x}PS_{6-x}Cl_x$ (where 0≤x≤2), $Li_{7-x}PS_{6-x}Br_x$ (where 0≤x≤2), or $Li_{7-x}PS_{6-x}I_x$ (where 0≤x≤2). In an implementation, the sulfide solid electrolyte may be an argyrodite-type compound including, e.g., $Li_6PS_5Cl$, $Li_6PS_5Br$, or $Li_6PS_5I$.

A density of the sulfide solid electrolyte may be, e.g., from 1.5 to 2.0 g/cc. When the sulfide solid electrolyte is within the above range, internal resistance of the all-solid secondary battery may be reduced and penetration of the solid electrolyte by Li may be effectively inhibited.

Solid Electrolyte Layer: Binder

The solid electrolyte layer 30 may include a binder. In an implementation, the binder included in the solid electrolyte layer 30 may include a suitable binder, e.g., styrene butadiene rubber (SBR), polytetrafluoroethylene, polyvinylidene fluoride, or polyethylene. The binder of the solid electrolyte layer 30 may be the same as or different from binders included in the positive active material layer 12 and a first negative active material layer 22.

Negative Electrode Layer

Negative Electrode Layer: Negative Active Material

The negative electrode layer 20 may include, e.g., a negative current collector 21 and a first negative active material layer 22 on the negative current collector 21. The first negative active material layer 22 may include, e.g., a negative active material and a binder.

The negative active material included in the first negative active material layer 22 may have, e.g., a particle shape. An average particle diameter of the negative active material having a particle shape may be, e.g., 4 μm or less, 2 μm or less, 1 μm or less, or 900 nm or less. The average particle diameter of the negative active material having a particle shape may be, e.g., from 10 nm to 4 μm, from 10 nm to 2 μm, or from 10 nm to 900 nm. When the average particle diameter of the negative active material is within the range above, reversible absorption and/or desorption of lithium may be performed during charging and discharging. The average particle diameter of the negative active material may be, e.g., a median diameter D50 measured using a laser particle diameter distribution analyzer.

The negative active material may include, e.g., a carbonaceous negative active material or a metal or metalloid negative active material.

In an implementation, the carbonaceous negative active material may be amorphous carbon. The amorphous carbon may include, e.g., carbon black (CB), acetylene black (AB), furnace black (FR), Ketjen black (KB), or graphene. In an implementation, the amorphous carbon may include a suitable carbonaceous material classified into amorphous carbon. Amorphous carbon is carbon that does not have crystallinity or has very low crystallinity and is distinguished from crystalline carbon or graphite-based carbon.

In an implementation, the metal or metalloid negative active material may include, e.g., gold (Au), platinum (Pt), palladium (Pd), silicon (Si), silver (Ag), aluminum (Al), bismuth (Bi), tin (Sn), zinc (Zn), or a suitable metal negative active material or metalloid negative active material capable of forming an alloy or compound with lithium. In an implementation, nickel (Ni) may not form an alloy with lithium, and Ni may not be a metal negative active material.

The first negative active material layer 22 may include one type of the negative active materials or a mixture of a plurality of different negative active materials among these negative active materials. In an implementation, the first negative active material layer 22 may include only amorphous carbon or may include gold (Au), platinum (Pt), palladium (Pd), silicon (Si), silver (Ag), aluminum (Al), bismuth (Bi), tin (Sn), or zinc (Zn). In an implementation, the first negative active material layer 22 may include, e.g., a mixture of amorphous carbon and gold (Au), platinum (Pt), palladium (Pd), silicon (Si), silver (Ag), aluminum (Al), bismuth (Bi), tin (Sn), or zinc (Zn). A mixing ratio of amorphous carbon and a metal or metalloid (such as gold) in the mixture may be a weight ratio selected with a view toward characteristics of the all-solid secondary battery 1, e.g., from 10:1 to 1:2, from 5:1 to 1:1, or from 4:1 to 2:1. Cycle characteristics of the all-solid secondary battery 1 may further be improved by including the negative active material having such a composition.

The negative active material included in the first negative active material layer 22 may include, e.g., a mixture of first particles formed of amorphous carbon and second particles formed of a metal or metalloid. The metal or metalloid may include, e.g., gold (Au), platinum (Pt), palladium (Pd), silicon (Si), silver (Ag), aluminum (Al), bismuth (Bi), tin (Sn), or zine (Zn). In an implementation, the metalloid may be a semiconductor. An amount of the second particles may be, e.g., from 8 to 60 wt %, from 10 to 50 wt %, from 15 to 40 wt %, or from 20 to 30 wt %, based on a total weight of the mixture. When the amount of the second particles is within the ranges above, cycle characteristics of the all-solid secondary battery 1 may be further improved.

Negative Electrode Layer: Binder

In an implementation, the binder included in the first negative active material layer 22 may include a suitable binder, e.g., styrene butadiene rubber (SBR), polytetraluoroethylene, polyvinylidene fluoride, polyethylene, a vinylidenefluoride/hexafluoropropylene copolymer, polyacrylonitrile, or polymethylmethacrylate. The binder may be used alone or in a combination of at least two thereof.

The first negative active material layer 22 may be stabilized on the negative current collector 21 by including the binder. In an implementation, cracks of the first negative active material layer 22 may be inhibited despite volume change and/or relative position change of the first negative active material layer 22 during charging and discharging. The first negative active material layer 22 did not include the binder, the first negative active material layer 22 could be easily separated from the negative current collector 21. As the first negative active material layer 22 is separated from the negative current collector 21, the negative current collector 21 may be in contact with the solid electrolyte layer at exposed portions of the negative current collector 21, thereby increasing the possibility of short circuits. The first negative active material layer 22 may be prepared, e.g., by applying a slurry in which materials constituting the first negative active material layer 22 are dispersed to the negative current collector 21 and drying the slurry. By adding the binder to the first negative active material layer 22, the negative active material may be stably dispersed in the slurry. In an implementation, when the slurry is applied to the negative current collector 21 by screen printing, it is possible to suppress clogging of the screen (e.g., clogging by agglomerates of the negative active material).

Negative Electrode Layer: Other Additives

The first negative active material layer 22 may further include other suitable additives used in known all-solid secondary batteries, e.g., a filler, a coating agent, a dispersing agent, or an ion-conductive agent.

Structure of Negative Electrode Layer

A thickness of the first negative active material layer 22 may be, e.g., 50% or less, 40% or less, 30% or less, 20% or less, 10% or less, or 5% or less, compared to a thickness of the positive active material layer 12. The thickness of the first negative active material layer 22 may be, e.g., from 1 μm to 20 μm, from 2 μm to 10 μm, or from 3 μm to 7 μm. As a thickness of the first negative active material layer 22 considerably decreases, lithium dendrite formed between the negative active material layer 22 and the negative current collector 21 may break the negative active material layer 22 making it difficult to improve cycle characteristics of the all-solid secondary battery 1. As a thickness of the negative active material layer 22 considerably increases, energy density of the all-solid secondary battery 1 may decrease and internal resistance of the all-solid secondary battery 1 may increase due to the negative active material layer 22, making it difficult to improve cycle characteristics of the all-solid secondary battery 1.

As the thickness of the first negative active material layer 22 decreases, e.g., a charging capacity of the negative active material layer 22, may also decrease. The charging capacity of the first negative active material layer 22 may be, e.g., 50% or less, 40% or less, 30% or less, 20% or less, 10% or less, 5% or less, or 2% or less, compared to a charging capacity of the positive active material layer 12. The charging capacity of the first negative active material layer 22 may be, e.g., from 0.1% to 50%, from 0.1% to 40%, from 0.1% to 30%, from 0.1% to 20%, from 0.1% to 10%, from 0.1% to 5%, or from 0.1% to 2%, compared to a charging capacity of the positive active material layer 12. As the charging capacity of the first negative active material layer 22 considerably decreases, the negative active material layer 22 may become very thin, and thus a lithium dendrite may be formed between the negative active material layer 22 and the negative current collector 21 during repeated charging and discharging processes, which may destroy the negative active material layer 22 making it difficult to improve cycle characteristics of the all-solid secondary battery 1. As the charging capacity of the first negative active material layer 22 considerably increases, energy density of the all-solid secondary battery 1 may decrease, and internal resistance of the all-solid secondary battery 1 may increase, due to the negative active material layer 22, making it difficult to improve cycle characteristics of the all-solid secondary battery 1.

The charging capacity of the positive active material layer 12 may be obtained by multiplying a charging capacity density (mAh/g) of the positive active material by a mass of the positive active material in the positive active material layer 12. When several types of positive active materials are used, charging capacity density X mass values of the respective positive active materials are calculated and a sum of these values is considered as the charging capacity of the positive active material layer 12. The charging capacity of the negative active material layer 22 is calculated in the same way. In an implementation, the charging capacity of the first negative active material layer 22 is obtained by multiplying a charging capacity density (mAH/g) of the negative active material by a mass of the negative active material in the negative active material layer 22. When several types of negative active materials are used, charging capacity density X mass values of the respective negative active materials are calculated and a sum of these values is considered as the charging capacity of the negative active material layer 22. In this regard, the charging capacity densities of the positive active material and the negative active material are capacities estimated using an all-solid-state half-cell including lithium metal as a counter electrode. The charging capacities of the positive active material layer 12 and the negative active material layer 22 are directly measured via charging capacity measurement using the all-solid-state half-cell. The charging capacity density is obtained by dividing the measured charging capacity by the mass of each active material. In an implementation, the charging capacities of the positive active material layer 12 and the first negative active material layer 22 may be initial charging capacities measured during the first cycle.

In an implementation, a carbon layer may be included between the negative active material layer and the solid electrolyte layer.

Negative Electrode Layer: Negative Current Collector

The negative current collector 21 may be formed of, e.g., a material that does not react with (e.g., does not form an alloy and a compound) with lithium. The material constituting the negative current collector 21 may include, e.g., copper (Cu), stainless steel, titanium (Ti), iron (Fe), cobalt (Co), and nickel (Ni). A thickness of the negative current collector 21 may be, e.g., from 1 to 20 μm, from 5 to 15 μm, or from 7 to 10 μm.

The negative current collector 21 may be formed of one of the above-described metals or an alloy or a coating material of at least two metals thereof. The negative current collector 21 is in the form of a plate or foil.

Referring to FIG. 6, the all-solid secondary battery 1 may further include, e.g., a thin film 24 including an element capable of forming an alloy with lithium on the negative current collector 21. The thin film 24 may be between the negative current collector 21 and the negative active material layer 22. The thin film 24 may include, e.g., an element capable of forming an alloy with lithium. The element capable of forming an alloy with lithium may include. e.g., gold, silver, zinc, tin, indium, silicon, aluminum, or bismuth. The thin film 24 may be formed of any one of these metals or an alloy of various types of metals. By arranging the thin film 24 on the negative current collector 21, a deposition form of a second negative active material layer between the thin film 24 and the first negative active material layer 22 may further be flattened and cycle characteristics of the all-solid secondary battery 1 may further be improved.

A thickness d24 of the thin film 24 may be, e.g., from 1 nm to 800 nm, from 10 nm to 700 nm, from 50 nm to 600 nm, or from 100 nm to 500 nm. If the thickness d24 of the thin film were to be less than 1 nm, function of the thin film 24 may be difficult to obtain. As the thickness d24 of the thin film considerably increases, the thin film 24 may absorb lithium and an amount of lithium deposited on the negative electrode layer 20 may decrease, and thus energy density of the all-solid secondary battery 1 may decrease and cycle characteristics of the all-solid secondary battery 1 may be reduced. The thin film 24 may be formed on the negative current collector 21, e.g., by vacuum deposition, sputtering, or plating.

Negative Electrode Layer: Negative Active Material

The negative electrode layer 20 may include the negative current collector 21 and the first negative active material layer 22 on the negative current collector 21. The first negative active material layer 22 may include, e.g., a negative active material and a binder.

The negative active material included in the first negative active material layer 22 may have, a particle shape. An average particle diameter of the negative active material having a particle shape may be, e.g., 4 μm or less, 2 μm or less, 1 μm or less, or 900 nm or less. The average particle diameter of the negative active material having a particle shape may be, e.g., from 10 nm to 4 μm, from 10 nm to 2 μm, or from 10 nm to 900 nm. When the average particle diameter of the negative active material is within the range above, reversible absorption and/or desorption of lithium may be performed during charging and discharging. The average particle diameter of the negative active material may be, e.g., a median diameter D50 measured using a laser particle diameter distribution analyzer.

The negative active material may include, e.g., a carbonaceous negative active material or a metal or metalloid negative active material.

In an implementation, the carbonaceous negative active material may be amorphous carbon. The amorphous carbon may be, e.g., carbon black (CB), acetylene black (AB), furnace black (FB), Ketjen black (KB), or graphene. Amorphous carbon is carbon that does not have crystallinity or has very low crystallinity and is distinguished from crystalline carbon or graphite-based carbon.

The metal or metalloid negative active material may include, e.g., gold (Au), platinum (Pt), palladium (Pd), silicon (Si), silver (Ag), aluminum (Al), bismuth (Bi), tin (Sn), or zinc (Zn). Nickel (Ni) may not form an alley with lithium, and Ni may not be a metal for a negative active material.

The first negative active material layer 22 may include one type of the negative active materials or a mixture of a plurality of different negative active materials among these negative active materials. In an implementation, the first negative active material layer 22 may include only amorphous carbon or may include a metal or metalloid, e.g., gold (Au), platinum (Pt), palladium (Pd), silicon (Si), silver (Ag), aluminum (Al), bismuth (Bi), tin (Sn), or zinc (Zn). In an implementation, the first negative active material layer 22 may include a mixture of amorphous carbon and a metal or metalloid, e.g., gold (Au), platinum (Pt), palladium (Pd), silicon (Si), silver (Ag), aluminum (Al), bismuth (Bi), tin (Sn), or zinc (Zn). A mixing ratio of amorphous carbon and a metal or metalloid such as gold in the mixture may be a weight ratio selected with a view toward characteristics of the all-solid secondary battery 1, e.g., from 10:1 to 1:2, from 5:1 to 1:1, or from 4:1 to 2:1. Cycle characteristics of the all-solid secondary battery 1 may further be improved by including the negative active material having such a composition.

The negative active material included in the first negative active material layer 22 may include, e.g., a mixture of first particles formed of amorphous carbon and second particles formed of a metal or metalloid. The metal or metalloid may include, e.g., gold (Au), platinum (Pt), palladium (Pd), silicon (Si), silver (Ag), aluminum (Al), bismuth (Bi), tin (Sn), or zinc (Zn). In an implementation, the metalloid may be a semiconductor. An amount of the second particles may be, e.g., from 8 to 60 wt %, from 10 to 50 wt %, from 15 to 40 wt %, or from 20 to 30 wt %, based on a total weight of the mixture. When the amount of the second particles is within the ranges above, cycle characteristics of the all-solid secondary battery 1 are further improved.

Negative Electrode Layer: Deposition Layer

Figure 7:
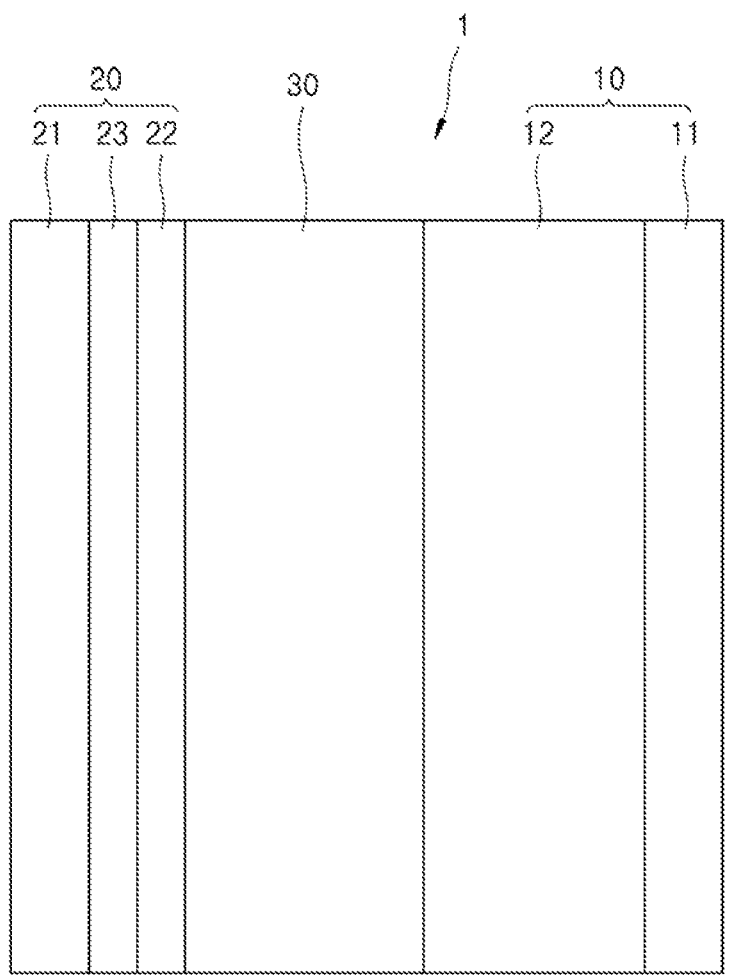

Referring to FIG. 7, the all-solid secondary battery 1 may further include, e.g., a second negative active material layer 23 between the negative current collector 21 and the first negative active material layer 22 by charging.

The second negative active material layer 23 may be a metal layer including lithium or a lithium alloy. The metal layer may include lithium or a lithium alloy. Thus, the second negative active material layer 23, as a metal layer including lithium, may serve as a reservoir of lithium. In an implementation, the lithium alloy may include, e.g., an Li—Al alloy, an Li—Sn alloy, an Li—In alloy, an Li—Ag alloy, an Li—Au alloy, an Li—Zn alloy, an Li—Ge alloy, or an Li—Si alloy. The second negative active material layer 23 may be formed of one of the alloys alone, lithium, or a combination of various types of alloys.

In an implementation, a thickness d23 of the second negative active material layer 23 may be, e.g., from 1 μm to 1,000 μm, from 1 μm to 500 μm, from 1 μm to 200 μm, from 1 μm to 150 μm, from 1 μm to 100 μm, or from 1 μm to 50 μm. When the thickness d23 of the second negative active material layer 23 considerably decreases, the function of the second negative active material layer 23 as a reservoir of lithium could be difficult to obtain. When the thickness d23 of the second negative active material layer considerably increases, mass and volume of the all-solid secondary battery 1 may increase, and thus cycle characteristics may deteriorate. The second negative active material layer 23 may be, e.g., a metal foil having a thickness within the range described above.

In the all-solid secondary battery 1, the second negative active material layer 23 may be arranged between the negative current collector 21 and the first negative active material layer 22 before assembling the all-solid secondary battery 1 or may be deposited between the negative current collector 21 and the first negative active material layer 22 by charging after assembling the all-solid secondary battery 1.

When the second negative active material layer 23 is arranged between the negative current collector 21 and the first negative active material layer 22 before assembling the all-solid secondary battery 1, the second negative active material layer 23 that is a metal layer including lithium may serve as a reservoir of lithium. Cycle characteristics of the all-solid secondary battery 1 including the second negative active material layer 23 may be further improved. In an implementation, a lithium foil may be arranged between the negative current collector 21 and the first negative active material layer 22 before assembling the all-solid secondary battery 1.

When the second negative active material layer 23 is arranged by charging after assembling the all-solid secondary battery 1, energy density of the all-solid secondary battery 1 may increase during the assembling process because the all-solid secondary battery 1 does not include the second negative active material layer 23. In an implementation, when the all-solid secondary battery 1 is charged, charging may be performed in a state exceeding the charging capacity of the first negative active material layer 22. In an implementation, the first negative active material layer 22 may be overcharged. At the beginning of charging, the first negative active material layer 22 may absorb lithium. In an implementation, the negative active material included in the first negative active material layer 22 may form an ally or compound with lithium ions that have migrated from the positive electrode layer 10. When the first negative active material layer 22 is overcharged to exceed the capacity thereof, e.g., lithium may be deposited on a rear surface of the first negative active material layer 22 (e.g., between the negative current collector 21 and the first negative active material layer 22) and a metal layer corresponding to the second negative active material layer 23 may be formed by the deposited lithium. The second negative active material layer 23 may be a metal layer mainly composed of lithium (e.g., lithium metal). These results are obtained because the negative active material included in the first negative active material layer 22 may be formed of a material forming an alloy or compound with lithium. During discharging, lithium of the first negative active material layer 22 and the second negative active material layer 23, e.g., the metal layer, may be ionized to migrate in a direction toward the positive electrode layer 10. Thus, it is possible to use lithium as a negative active material in the all-solid secondary battery 1. In addition, the second negative active material layer 23 may be coated with the first negative active material layer 22, the negative active material layer 22 may serve as a protective layer for the second negative active material layer 23, e.g., the metal layer, and may inhibit the growth of lithium dendrite. Therefore, short circuits and decrease in capacity of the all-solid secondary battery 1 may be prevented and thus cycle characteristics of the all-solid secondary battery 1 may be improved. In an implementation, when the second negative active material layer 23 is arranged by charging after assembling the all-solid secondary battery 1, the negative current collector 21, the first negative active material layer 22, and an area therebetween may be Li-free areas not including lithium (Li) at the beginning of charging or after discharging of the all-solid secondary battery 1.

Hereinafter, a method of preparing the sulfide solid electrolyte according to an embodiment will be described.

The sulfide solid electrolyte may be prepared by a method including, e.g., mixing a sulfur (S) precursor, a phosphorus (P) precursor, and a halogen precursor, as precursors for forming a sulfide solid electrode to prepare a precursor mixture and then contacting the precursor mixture; and heat-treating the precursor mixture at a temperature over 350° C.

The heat-treating may be performed under vacuum conditions at a temperature of 500° C. to 650° C. for 5 hours or more, e.g., 20 hours. The precursor mixture may be added to a borosilicate ampoule, and a vacuum condition may be made by torch-sealing under a vacuum condition. According to the preparation method as described above, a sulfide solid electrolyte having high purity and high ionic conductivity may be obtained without using a conventional heat-treatment process performed under vacuum conditions with expensive and toxic $H_2S$. When the heat-treating is performed at a temperature within the range above, impurity phases may not be formed, and a sulfide solid electrolyte having high purity and improved physical properties and electrochemical stability may be obtained.

In the method of preparing the sulfide solid electrolyte according to an embodiment, the contacting the precursors mixture includes mechanically milling the sulfur (S) precursor, the phosphorus (P) precursor, and the halogen precursor.

As the sulfur (S) precursor, $Li_2S$ is used. As the phosphorus (P) precursor, $P_2S_5$, phosphorus powder, $P_2O_5$, $(NH_4)_2HPO_4$, $(NH_4)H_2PO_4$, $Na_2HPO_4$, $Na_3PO_4$, or a combination thereof is used, and as the halogen precursor, LiCl, LiI, LiBr, or a combination thereof is used.

The amount of the sulfur (S) precursor, the phosphorus (P) precursor, and the halogen precursor is stoichiometrically controlled to obtain the sulfide solid electrolyte of according to an embodiment.

Next, a method of preparing an all-solid secondary battery using the above-described sulfide solid electrolyte will be described.

First, the positive active material, the binder, the solid electrolyte, the conductive material, and the solvent may be mixed to prepare a positive active material layer composition.

The positive active material layer composition may be coated on the positive current collector and dried to form the positive active material layer, thereby providing the positive electrode layer.

The drying may be performed at a temperature of 40 to 60° C.

Separately, the method may include, e.g., providing a negative electrode layer including a negative current collector and a first negative active material layer; preparing a laminate by interposing a solid electrolyte layer between the negative electrode layer and the positive electrode layer; and pressing the laminate.

The solid electrolyte layer may be a solid electrolyte layer including the sulfide solid electrolyte according to an embodiment.

The pressing may be performed at a temperature of 25 to 90° C. with a pressure of 550 MPa or less, e.g., 500 MPa or less, or 400 MPa to 500 MPa, to complete the manufacture of the all-solid secondary battery. A pressing time may vary according to temperature and pressure and may be, e.g., less than 30 minutes. The pressure may be applied by, e.g., isostatic pressing, roll pressing, or plate pressing.

The all-solid secondary battery according to an embodiment may be applied to large-sized batteries or energy storage systems (ESS).

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparation of Solid Electrolyte

Example 1

$Li_2S$, $P_2S_5$, and LiCl were quantified in the appropriate non-stoichiometric ratio to obtain the sulfide solid electrolyte shown in Table 1 and then mixed with a mortar in a glove box over 1 hour to prepare a precursor mixture. 2,000 mg of the powder materials obtained by the mechanical milling were added to a Borosilicate ampoule and the ampoule was connected to a vacuum pump to make a vacuum atmosphere and sealed using a torch. The ampoule sealed in a vacuum atmosphere was heat-treated at 550° C. for 12 hours to obtain a sulfide solid electrolyte.

Examples 2 to 4

Sulfide solid electrolytes were obtained in the same manner as in Example 1, except that the amounts of $Li_2S$, $P_2S_5$, LiCl, and $Li_3N$ were weighed respectively to obtain the sulfide solid electrolytes according to Examples 2 to 4 shown in Table 1 below.

Comparative Examples 1 to 6

Sulfide solid electrolytes were obtained in the same manner as in Example 1, except that the amounts of $Li_2S$, $P_2S_5$, LiCl, and $Li_3N$ were weighed respectively to obtain the sulfide solid electrolytes according to Comparative Examples 1 to 6 shown in Table 1 below.

TABLE 1

| Example | Composition |
| --- | --- |
| Example 1 | $Li_{5.04}PS_{4.46}Cl_{1.13}$ |
| Example 2 | $Li_{5.28}PS_{4.47}Cl_{1.34}$ |
| Example 3 | $Li_{5.20}PS_{4.44}Cl_{1.32}$ |
| Example 4 | $Li_{5.20}PS_{4.46}Cl_{1.29}$ |
| Comparative Example 1 | $Li_{4.54}PS_{4.21}Cl_{1.11}$ |
| Comparative Example 2 | $Li_{4.64}PS_{4.44}Cl_{0.75}$ |
| Comparative Example 3 | $Li_{5.33}PS_{4.5}Cl_{1.34}$ |
| Comparative Example 4 | $Li_{5.57}PS_{4.91}Cl_{0.76}$ |
| Comparative Example 5 | $Li_{5.38}PS_{4.52}Cl_{1.34}$ |
| Comparative Example 6 | $Li_{5.65}PS_{4.85}Cl_{0.95}$ |

As shown in Table 1, the sulfide solid electrolytes of Comparative Examples 1 and 2 had lower lithium contents than those of the sulfide solid electrolytes of Examples 1 to 4 and the sulfide solid electrolytes of Comparative Examples 3 to 6 had higher lithium contents than those of the sulfide solid electrolytes of Examples 1 to 4.

Preparation of all-Solid Secondary Battery

Manufacturing Example 1

Preparation of Positive Electrode Layer $LiNi_{0.8}Co_{0.15}Mn_{0.05}O_2$ (NCM) was prepared as a positive active material. Crystalline argyrodite-type solid electrolyte ($Li_6PS_5Cl$) was used as a solid electrolyte. In addition, polytetrafluoroethylene (PTFE, Teflon binder by Dupont) was prepared as a binder and carbon nanofiber (CNF) was prepared as a conductive agent. These materials were mixed with octyl acetate, as a dispersion medium, such that a weight ratio of positive active material:solid electrolyte: carbon nanofiber:binder satisfied 86.91:11.85:0.25:0.99 to prepare a positive active material layer-forming composition. A total weight of solids in the positive active material layer refers to a sum of the weights of the positive active material, the solid electrolyte, the carbon nanofiber, and the binder.

The positive active material layer-forming composition was molded in a sheet form and then dried by first heat treatment performed at 40° C. in a convection oven for 2 hours. Then, the resultant was dried by second heat treatment performed at 80° C. in a vacuum oven for 12 hours to prepare a positive electrode sheet.

Preparation of Negative Electrode Layer

As a negative current collector, a nickel (Ni) foil with a thickness of 10 μm was prepared. In addition, carbon black (CB) particles with a primary particle diameter of about 30 nm and silver (Ag) particles with an average particle diameter of about 60 nm were prepared as negative active materials.

0.25 g of a mixed powder in which carbon black (CB) particles and silver (Ag) particles were mixed in a weight ratio of 3:1 was added to a container and 2 g of an NMP solution including 7 wt % of a PVDF binder (Kureha Corporation #9300) was added thereto to prepare a mixed solution. Then, the mixed solution was stirred while gradually adding NMP to the mixed solution to prepare a slurry. The prepared slurry was applied to the Ni foil using a bar coater and dried at 80° C. in a convection oven for 10 minutes to obtain a laminate. The obtained laminate was dried in a vacuum oven at 100° C. for about 10 hours. According to the above-described process, a negative electrode layer in which the first negative active material layer is formed on the negative current collector was prepared.

Preparation of Solid Electrolyte Layer

An acrylic binder (SX-A334, Zeon Co., Ltd.) was added to octyl acetate to prepare a 4 wt % binder solution. The prepared acrylic binder solution was added to the sulfide solid electrolyte (D50=3 μm, crystalline) of Example 1 and mixed using a Thinky mixer to prepare a slurry. The slurry included 98.5 parts by weight of the solid electrolyte and 1.5 parts by weight of the acrylic binder. The prepared slurry was applied to a non-woven fabric using a bar coater and dried in a convection oven at 50° C. for 5 minutes to obtain a laminate. The obtained laminate was dried in a vacuum oven at 40° C. for over 10 hours. According to the above-described process, the solid electrolyte layer was prepared.

Preparation of all-Solid Secondary Battery

The solid electrolyte layer was interposed between the positive electrode layer and the negative electrode layer to prepare a laminate. The prepared laminate was pressed at 80° C. with a pressure of 500 MPa for 10 minutes by a hot plate press to prepare an all-solid secondary battery. The solid electrolyte layer was sintered by the pressing and characteristics of the battery were improved. A thickness of the pressed positive active material layer was about 80 μm, a thickness of the negative active material layer was 7 μm, and a thickness of the solid electrolyte layer was 60 μm.

Manufacturing Examples 2 to 4

All-solid secondary batteries were prepared in the same manner as in Manufacturing Example 1, except that the sulfide solid electrolytes of Examples 2 to 4 were used instead of the sulfide solid electrolyte of Example 1 in the preparation of the solid electrolyte layer.

Comparative Manufacturing Examples 1 to 4

All-solid secondary batteries were prepared in the same manner as in Manufacturing Example 1, except that the sulfide solid electrolytes of Comparative Examples 1 to 4 were used instead of the sulfide solid electrolyte of Example 1 in the preparation of the solid electrolyte layer.

Evaluation Example 1: Measurement of Ionic Conductivity

Powder of each of the sulfide solid electrolytes prepared in Examples 1 to 4 and Comparative Examples 1 to 6 was added to a mold with a diameter of 10 mm and pressed with a pressure of 350 mPa to form pellets. Indium (In) thin films were formed on both surfaces of the pellets to prepare a sample for measuring ionic conductivity. Impedance of the prepared samples was measured using an AUTOLAB PGSTAT30 (Metrohm Autolab Co. Ltd.) potentiostat, a Nyquist plot was illustrated, and ionic conductivity was measured therefrom at 25° C.

The measured ionic conductivity is shown in Table 2 below.

TABLE 2

| Example | Composition | Ionic conductivity (25° C.)(mS/cm) |
| --- | --- | --- |
| Example 1 | $Li_{5.04}PS_{4.46}Cl_{1.13}$ | 4.46 |
| Example 2 | $Li_{5.28}PS_{4.47}Cl_{1.34}$ | 3.87 |
| Example 3 | $Li_{5.20}PS_{4.44}Cl_{1.32}$ | 2.56 |
| Example 4 | $Li_{5.20}PS_{4.46}Cl_{1.29}$ | 2.30 |
| Comparative Example 1 | $Li_{4.54}PS_{4.21}Cl_{1.11}$ | 0.36 |
| Comparative Example 2 | $Li_{4.64}PS_{4.44}Cl_{0.75}$ | 0.98 |
| Comparative Example 3 | $Li_{5.33}PS_{4.5}Cl_{1.34}$ | 1.867 |
| Comparative Example 4 | $Li_{5.57}PS_{4.91}Cl_{0.76}$ | 1.03 |
| Comparative Example 5 | $Li_{5.38}PS_{4.52}Cl_{1.34}$ | 1.562 |
| Comparative Example 6 | $Li_{5.65}PS_{4.85}Cl_{0.95}$ | 0.91 |

As shown in Table 2, the solid electrolytes of Examples 1 to 4 had ionic conductivities of 2 mS/cm or more indicating that the ionic conductivities were suitable for solid electrolytes for all-solid secondary batteries. In addition, the solid electrolytes of Example 1 and 2 exhibited much improved ionic conductivity at 25° C., compared with the solid electrolytes of Comparative Examples 1 to 6.

Evaluation Example 2: X-Ray Diffraction (XRD) Analysis

Figure 2:
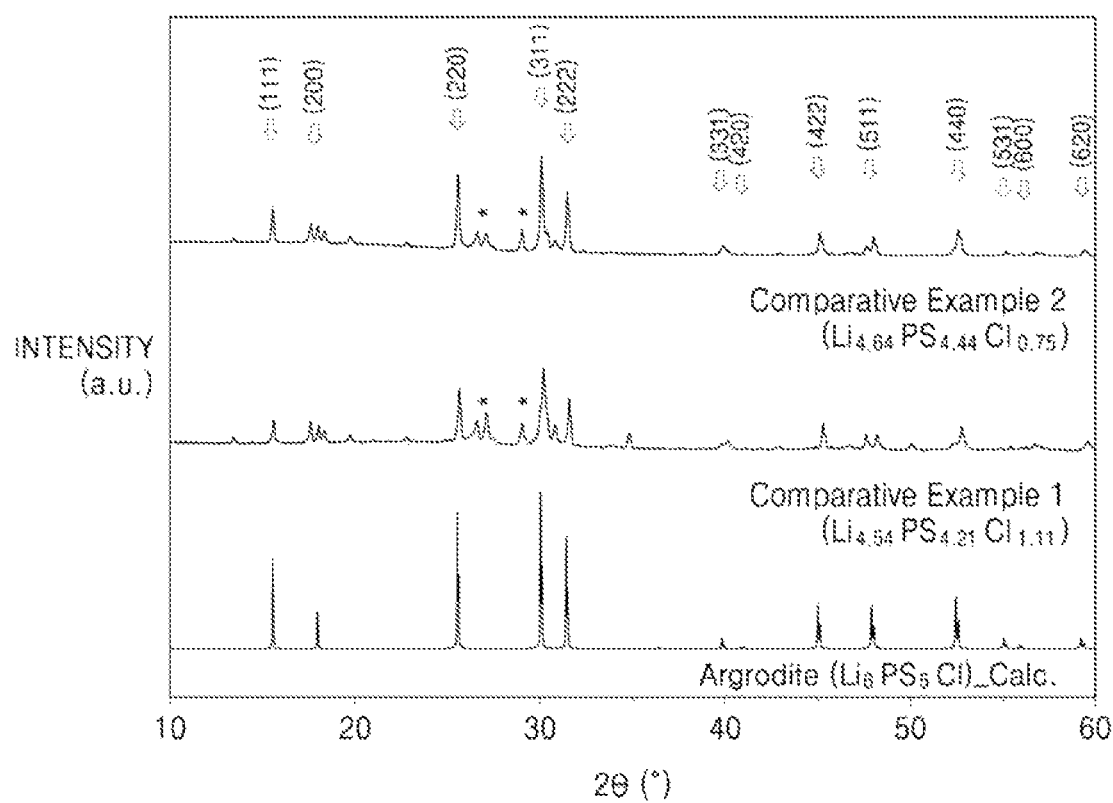
FIG. 2 shows XRD spectra of sulfide solid electrolytes prepared in Comparative Examples 1 and 2, and $Li_6PS_5Cl$.
Figure 3:
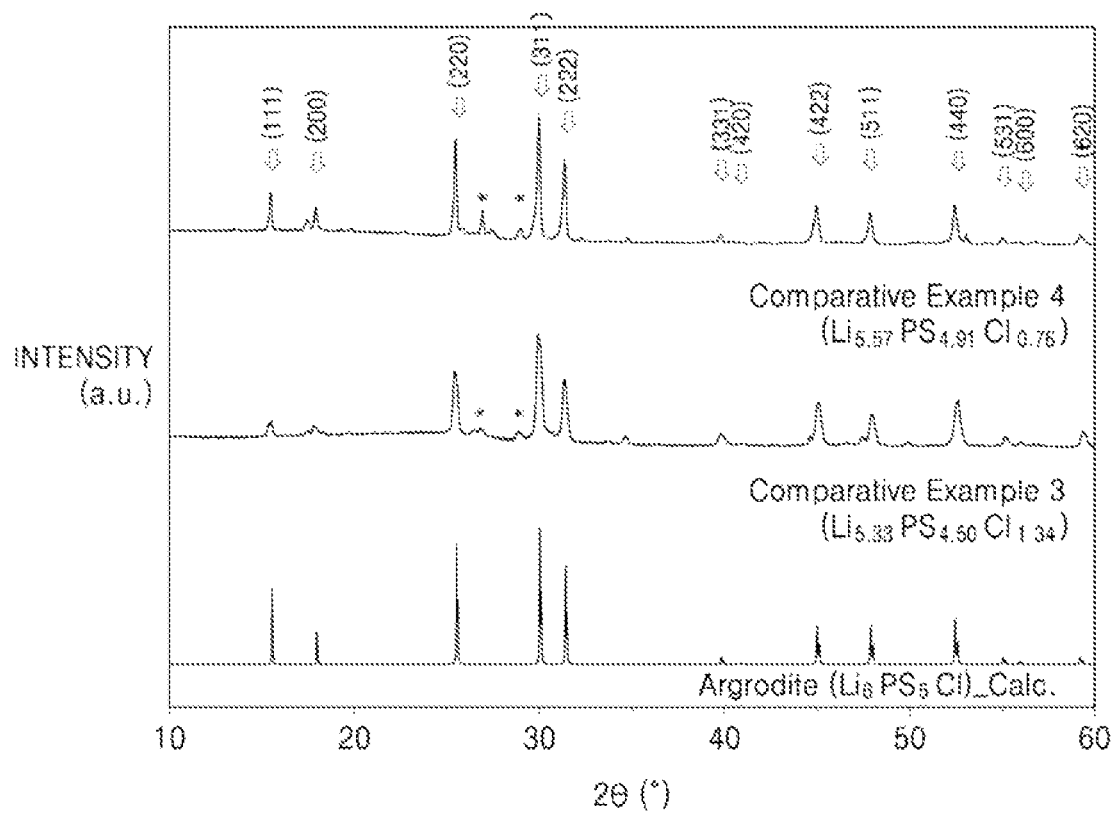
FIG. 3 shows XRD spectra of sulfide solid electrolytes prepared in Comparative Examples 3 and 4, and $Li_6PS_5Cl$.

XRD spectra of the sulfide solid electrolytes prepared in Examples 1 and 2 and Comparative Examples 1 to 4 were measured and the results are shown in FIGS. 1 to 3. The X-ray diffraction analysis was performed using a D8 Advance of Bruker using Cu Kα radiation.

FIG. 1 shows XRD spectra of the sulfide solid electrolytes prepared in Examples 1 and 2 and $Li_6PS_5Cl$, and FIG. 2 shows XRD spectra of the sulfide solid electrolytes prepared in Comparative Examples 1 and 2 and $Li_6PS_5Cl$. In addition, FIG. 3 shows XRD spectra of the sulfide solid electrolytes prepared in Comparative Examples 3 and 4 and $Li_6PS_5Cl$.

TABLE 3

| Example | $I_{(27.1)}$ | $I_{(29.0)}$ | $I_{(30.0)}$ | $I_{(27.1)}/I_{(30.0)}$ | $I_{(29.0)}/I_{(30.0)}$ |
| --- | --- | --- | --- | --- | --- |
| Example 1 | 790 | 9 | 14420 | 0.055 | 0.0006 |
| Example 2 | 1164 | 694 | 19672 | 0.059 | 0.035 |
| Comparative Example 1 | 3188 | 1930 | 7804 | 0.409 | 0.247 |

TABLE 3-continued

| Example | $I_{(27.1)}$ | $I_{(29.0)}$ | $I_{(30.0)}$ | $I_{(27.1)}/I_{(30.0)}$ | $I_{(29.0)}/I_{(30.0)}$ |
|---|---|---|---|---|---|
| Comparative Example 2 | 1730 | 2177 | 9852 | 0.176 | 0.221 |
| Comparative Example 3 | 1300 | 677 | 12295 | 0.106 | 0.055 |
| Comparative Example 4 | 3291 | 1260 | 14547 | 0.226 | 0.087 |

Referring to FIG. 1, the solid electrolytes of Examples 1 and 2 exhibited $I_{(27.1)}/I_{(30.0)}$ and $I_{(29.0)}/I_{(30.0)}$ ratios of 0.06 or less. Based on these results, it may be seen that impurity phases decreased in the sulfide solid electrolytes of Examples 1 and 2.

On the contrary, referring to FIGS. 2 and 3, the sulfide solid electrolytes of Comparative Examples 1, 2, and 4 and $Li_6PS_5Cl$ exhibited $I_{(27.1)}/I_{(30.0)}$ and $I_{(29.0)}/I_{(30.0)}$ ratios greater than 0.06 and the sulfide solid electrolyte of Comparative Example 3 had an $I_{(27.1)}/I_{(30.0)}$ ratio of 0.055 (e.g., 0.06 or less) but an $I_{(29.0)}/I_{(30.0)}$ ratio greater than 0.06. Based thereon, it may be seen that the sulfide solid electrolytes of Comparative Examples 1 to 4 had more impurity phases, which deteriorate ionic conductivity, than those of Examples 1 and 2.

Referring to FIGS. 1 to 3, it may be seen that the sulfide solid electrolyte of Examples 1 and 2 had argyrodite-type crystal structures, as did those of Comparative Examples 1 to 4 and $Li_6PS_5Cl$.

Evaluation Example 3: Evaluation of Young's Modulus

A thickness of the sulfide solid electrolyte prepared according to Example 1 was about 20 μm.

Tensile modulus of the solid electrolyte layer was measured using a DMA800 (TA Instruments) and the solid electrolyte layer sample was prepared in accordance with ASTM standard D412 (Type V specimens). The tensile modulus is also called Young's modulus.

Strain of the solid electrolyte layer with respect to stress at a rate of 5 mm/min was measured at 25° C. with a relative humidity of about 30%. The tensile modulus was obtained from a slope of a stress-strain curve.

Young's modulus evaluation results of the solid electrolyte layer are shown in Table 4 below and FIG. 4.

TABLE 4

| Example | Young's modulus (GPa) |
|---|---|
| Example 1 | 87.16 |

Figure 4:
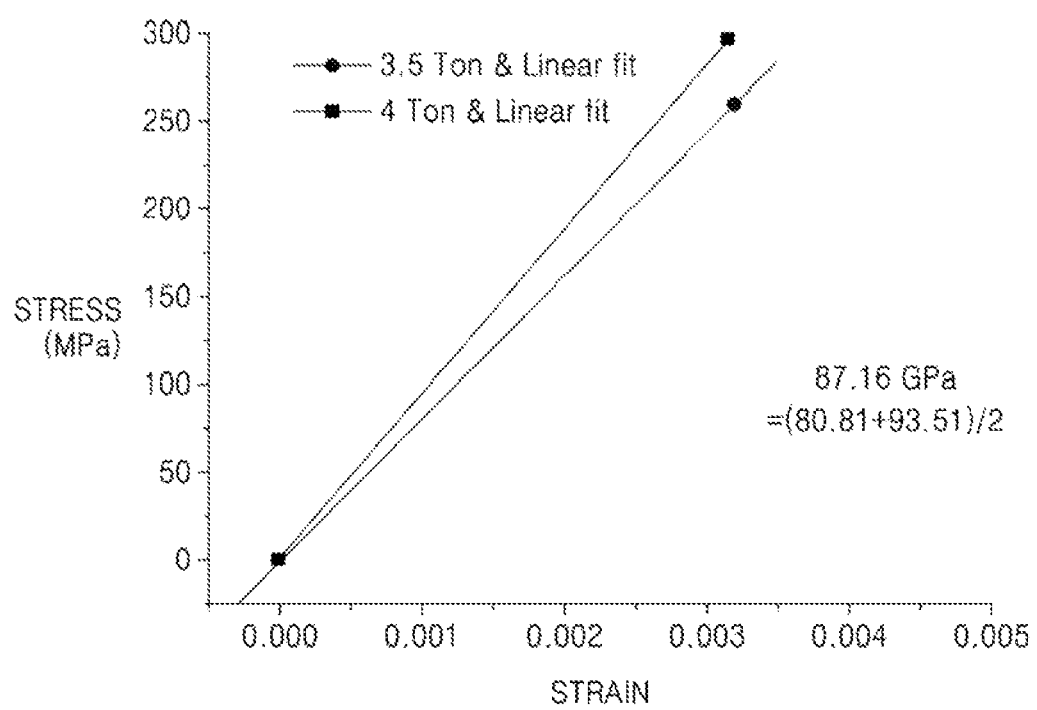
FIG. 4 is a graph showing Young's modulus of a sulfide solid electrolyte prepared in Example 1.

Referring to Table 4 and FIG. 4, it may be seen that the solid electrolyte layer prepared according to Example 1 had excellent tensile modulus.

Evaluation Example 4: Charging and Discharging Test

The all-solid secondary batteries according to Manufacturing Examples 1 and 2, Comparative Manufacturing Examples 1, 2, 3, and 4 were subjected to a charging and discharging test to evaluate charging and discharging characteristics thereof.

Each of the batteries was charged at a constant current of 0.1 C for 10 hours until the voltage reached 4.25 V and discharged at a constant current of 0.05 C for 20 hours until the voltage reached 2.5 V (first cycle). Then, the battery was charged at a constant current of 0.1 C for 10 hours until the voltage reached 4.25 V and discharged at a constant current of 0.33 C for 3 hours until the voltage reached 2.5 V (second cycle. Then, the battery was charged at a constant current of 0.1 C for 10 hours until the voltage reached 4.25 V. Then, the battery was discharged at a constant current of 0.5 C for 2 hours until the voltage reached 2.5 V (third cycle). Then, the battery was charged at a constant current of 0.1 C for 10 hours until the voltage reached 4.25 V. Then, the battery was discharged at a constant current of 1 C for 1 hour until the voltage reached 2.5 V (fourth cycle).

Then, the battery was charged at a constant current of 0.33 C for 3 hours until the voltage reached 4.25 V. Then, the battery was discharged at a constant current of 0.33 C for 3 hours until the voltage reached 2.5 V (fifth cycle).

These cycles were repeated 100 times in total.

After the cycles were repeated, an average voltage, lifespan characteristics, and capacity characteristics were tested.

As a result of evaluating the above-described characteristics, the all-solid batteries of Manufacturing Examples 1 and 2 had superior capacity, average voltage, and lifespan characteristics, compared to those of Comparative Manufacturing Examples 1 to 4.

By way of summation and review, some lithium-ion batteries may use an electrolytic solution including a flammable organic dispersion medium, and there is a possibility of overheating and fire when a short circuit occurs. Therefore, all-solid batteries using a solid electrolyte instead of an electrolytic solution have been considered.

All-solid batteries may not use a flammable organic dispersion medium, and the possibility of a fire or explosion may be considerably reduced even in the event a short circuit. Therefore, such all-solid batteries may have superior safety to lithium-ion batteries including an electrolytic solution.

Sulfide solid electrolytes may be used as solid electrolytes of all-solid batteries. However, some sulfide solid electrolytes may have insufficient ionic conductivity and mechanical properties.

The sulfide solid electrolyte for all-solid secondary batteries according to an embodiment may have high ionic conductivity in a wide temperature area and excellent mechanical properties. By using the solid electrolyte including the sulfide solid electrolyte, an all-solid secondary battery having excellent capacity and lifespan characteristics may be prepared.

One or more embodiments may provide sulfide solid electrolytes for all-solid secondary batteries.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A sulfide solid electrolyte for all-solid secondary batteries, the sulfide solid electrolyte being a compound represented by Formula 1 below, $$Li_aP_1S_bX_c \qquad \text{Formula 1}$$

in Formula 1,

X may be fluorine (F), chlorine (Cl), bromine (Br), or iodine (I), and $4.7<a<5.3$, $4.4\leq b\leq 4.5$, and $0.7<c<1.5$, wherein:

the sulfide solid electrolyte has an argyrodite-type crystal structure, a ratio ($I_{(29.0)}/I_{(30.0)}$ ratio) of a peak intensity at a 2θ of 29±0.1° to a peak intensity at a 2θ of 30±0.1° is 0.06 or less, the peak intensities being obtained by X-ray diffraction analysis of the sulfide solid electrolyte, and a ratio ($I_{(27.1)}/I_{(30.0)}$ ratio) of a peak intensity at a 2θ of 27.1±0.1° to a peak intensity at a 2θ of 30±0.1° is 0.06 or less, the peak intensities being obtained by X-ray diffraction analysis of the sulfide solid electrolyte.

2. The sulfide solid electrolyte for all-solid secondary batteries as claimed in claim 1, wherein the $I_{(29.0)}/I_{(30.0)}$ ratio is from 0.0006 to 0.04.

3. The sulfide solid electrolyte for all-solid secondary batteries as claimed in claim 1, wherein the $I_{(27.1)}/I_{(30.0)}$ ratio is from 0.055 to 0.059.

4. The sulfide solid electrolyte for all-solid secondary batteries as claimed in claim 1, wherein an atomic ratio of lithium to sulfur (Li/S) in the sulfide solid electrolyte is 1.13 or higher.

5. The sulfide solid electrolyte for all-solid secondary batteries as claimed in claim 1, wherein:

the sulfide solid electrolyte is a compound represented by Formula 2 below, $$Li_aPS_bCl_c \qquad \text{Formula 2}$$

in Formula 2, $5.04\leq a\leq 5.28$, $4.4\leq b\leq 4.5$, and $1.13\leq c\leq 1.34$.

6. The sulfide solid electrolyte for all-solid secondary batteries as claimed in claim 1, wherein the compound represented by Formula 1 is $Li_{5.04}PS_{4.46}Cl_{1.13}$, $Li_{5.28}PS_{4.47}Cl_{1.34}$, $Li_{5.20}PS_{4.44}Cl_{1.32}$, $Li_{5.20}PS_{4.46}Cl_{1.29}$, or a combination thereof.

7. The sulfide solid electrolyte for all-solid secondary batteries as claimed in claim 1, wherein the sulfide solid electrolyte has a Young's modulus of 80 GPa or higher.

8. The sulfide solid electrolyte for all-solid secondary batteries as claimed in claim 1, wherein the sulfide solid electrolyte has an ionic conductivity of 2 mS/cm or higher.

9. An all-solid secondary battery, comprising:

a positive electrode layer;

a negative electrode layer; and a solid electrolyte layer therebetween, wherein the positive electrode layer or the solid electrolyte layer includes the sulfide solid electrode as claimed in claim 1.

10. The all-solid secondary battery as claimed in claim 9, wherein:

the negative electrode layer includes a negative current collector, a first negative active material layer, and a second negative active material layer, the second negative active material layer is on the first negative active material layer or between the negative current collector and the first negative active material layer, and the second negative active material layer includes lithium or a lithium alloy.

11. The all-solid secondary battery as claimed in claim 9, wherein:

the negative electrode layer includes a negative current collector and a first negative active material layer, and a carbon layer is between the first negative active material layer and the solid electrolyte layer.

12. A method of preparing the sulfide solid electrolyte for all-solid secondary batteries as claimed in claim 8, the method comprising:

mixing a sulfur precursor, a phosphorus precursor, and a halogen precursor, as precursors for forming a sulfide solid electrode, to prepare a precursor mixture, and then contacting the precursor mixture of the sulfur precursor, the phosphorus precursor, and the halogen precursor; and heat-treating the precursor mixture at a temperature of 350° C. or higher.

13. The method as claimed in claim 12, wherein the heat-treating is performed under vacuum conditions at a temperature of 500° C. to 650° C. for 5 hours or longer.

14. The method of claim 12, wherein the contacting of the precursor mixture comprises mechanically milling the sulfur (S) precursor, the phosphorus (P) precursor, and the halogen precursor.

* * * * *